United States Patent [19]

Courregelongue et al.

[11] Patent Number: 4,880,573

[45] Date of Patent: Nov. 14, 1989

[54] PROCESS FOR ELIMINATING CHOLESTEROL CONTAINED IN A FATTY SUBSTANCE OF ANIMAL ORIGIN AND THE FATTY SUBSTANCE WITH REDUCED CHOLESTEROL OBTAINED

[75] Inventors: Jean Courregelongue; Jean-Pierre Maffrand, both of Portet/Garonne, France

[73] Assignee: Monserbio, Annecy, France

[21] Appl. No.: 73,458

[22] Filed: Jul. 15, 1987

[30] Foreign Application Priority Data

Jul. 24, 1986 [FR] France .................... 86 10982

[51] Int. Cl.$^4$ .................... C09F 5/10; A23C 12/02
[52] U.S. Cl. .................... 260/420; 426/417
[58] Field of Search .................... 260/420; 426/417

[56] References Cited

U.S. PATENT DOCUMENTS 3,059,008 10/1962 Baur .................... 260/420

OTHER PUBLICATIONS

J. Szejtli, "Cyclodextrins in Food, Cosmetics and Toiletries", in Starke, vol. 34, No. 11, Nov. 1982, pp. 379–385.

Chemical Abstracts, vol. 96, No. 3, Feb. 1982, p. 526.

*Primary Examiner*—Anton H. Sutto
*Attorney, Agent, or Firm*—Wegner & Bretschneider

[57] ABSTRACT

In a process for eliminating cholesterol from fatty substances of animal origin used in human diet, the liquefied fatty substances is put into contact with a cyclodextrin, this contact is continued under stirring for 30 minutes to 10 hours at a temperature between the fusion temperature of the fatty substance and 80° C. in such a way as to allow the formation of complexes between the cholesterol and the cyclodextrin, after which the complexes are separated by entrainment in water and separation of the aqueous phase.

13 Claims, No Drawings

PROCESS FOR ELIMINATING CHOLESTEROL CONTAINED IN A FATTY SUBSTANCE OF ANIMAL ORIGIN AND THE FATTY SUBSTANCE WITH REDUCED CHOLESTEROL OBTAINED

The present invention concerns a new process for eliminating cholesterol contained in a fatty substance of animal origin by complexation with cyclodextrins.

The invention also concerns the fatty material with reduced cholesterol thus obtained.

The present invention concerns a new process for eliminating cholesterol from a fatty substance of animal origin and the fatty substance thus treated.

Fatty substances from animals contain sterols and, in particular, cholesterol. J. P. WOLFF (in MANUEL D'ANALYSE des CORPS GRAS, Azoulay. Ed., Paris, 1968, p. 552) has given the content in sterols, expressed in mg per 100 g, of various animal substances, in the following way:

| LARD | BEEF SUET | HORSE FAT | SARDINE FAT | BUTTER |
|---|---|---|---|---|
| 50-120 | 75-140 | 80-120 | 275-500 | 225-350 |

98 percent of these sterols are represented by cholesterol.

Epidemiological studies (Lipid Research Clinics Program. The Lipid Research Clinics Coronary Primary Prevention Trials. J. Amer. Med. Ass., 1984, 251, 351-374) having established a positive correlation between high levels of plasmatic cholesterol and cardiovascular illnesses, it seemed opportune to have available a process of elimination enabling the amount of cholesterol present in animal fats, such as butter, lard and suet, used in human diet, to be significantly reduced.

Numerous trials have been carried out but none of them have led to a really satisfactory process: precipitation with digitonin, extraction by a solvent which can leave toxic residues in the fatty substance; finally, absorption on columns and micro-distillation are processes which are difficult to put into operation industrially because they involve a heavy substance and complex and costly operations.

The applicant has precisely perfected a new general process which can be used on an industrial scale which enables the cholesterol contained in a fatty substance of animal origin to be eliminated.

This process takes advantage of the capacity inherent in cyclodextrins of forming inclusion complexes with certain organic molecules.

The cyclodextrins are cyclic oligosaccharides made up of glycopyranose units linked together by an alpha (1→4) osidic bond. They have a hydrophobic cavity which allows the formation of inclusion complexes by insertion of organic molecules. Their toxicity has also been studied and it has been noted that the administration by oral route of these cyclodextrins has not revealed any toxic effect in rats and in dogs (J. SZEJTLI, Molecular entrapment and release properties of drugs by cyclodextrins, in Controlled drug bio-availability, Vol. 3, V. F. SMOLEN and L. A. BALL ed. 1985, J. WILEY, p. 365; W. SAENGER, Angew. Chem. Int. Ed. Engl., 1980, 19, 344).

Cyclodextrins are at present mainly used for complexing pesticides. Other applications have been described and in particular their use for extracting free fatty acids from vegetable oils (J. SZEJTLI, Cyclodextrins: a new group of industrial basic materials, Die Nahrung, 1985, 29 (9), 911-924) but their use for the extraction of cholesterol had still not been envisaged.

The process according to the invention includes a stage of complexing sterols followed by a stage of separating the complexes formed. The fatty substance concerned, kept in a liquid state, is put into contact with the chosen cyclodextrin under a non-oxidizing atmosphere. When a fatty substance which is solid at ambient temperature is concerned, it is advisable to convert it to a liquid state by moderate heating to a temperature between the fusion temperature of the fatty substance and 80° C. Preferably, contact is achieved at a temperature in the region of 40° C.; this contact is also facilitated by stirring advantageously maintained throughout this stage of complexing which may last several hours. Preferably, beta-cyclodextrin, made up of seven glucopyranose units, is used. Other cyclodextrins such as 2,6-di-0-methyl-beta-cyclodextrin, 2,3,6-tri-0-methyl-beta-cyclodextrin, and alpha-cyclodextrin the dimensions of which also allow the formation of inclusion complexes, can be used. The amounts of cyclodextrin used can vary from 1% to 10% by weight in relation to the amounts of fatty substance concerned. The complexes, formed during this first stage between the cholesterol molecules and the cyclodextrin molecules, are then eliminated by entrainment in the aqueous phase and separation of the said phase. Stirring of the reactional medium helps to make the complexes dissolve in water. A physical process such as decanting then enables the lipid phase and the aqueous phase to be separated.

The lipid phase which has been collected can be advantageously submitted to a washing stage which can comprise several successive washes with water in order to eliminate an increased number of complexes.

In order to achieve a more complete extraction of the cholesterol, several further successive extraction operations can be carried out, possibly followed each time by a washing stage of the lipid phase.

The continuous application of this process in the end allows up to 80% of the sterols contained in an animal fatty substance to be eliminated, the percentage of cholesterol eliminated being in particular a function of the cholesterol content of the fatty substance concerned.

This process is suitable for the elimination of cholesterol from animal fatty substances used in human diet, and more particularly for the extraction of cholesterol from milk-based fatty substances and in particular from dehydrated or non-dehydrated butter as well as from suet and lard.

The invention also concerns, according to a second aspect, the fatty substances with reduced sterols which the process used enables to be obtained.

Non-limitative examples of realizing the invention are described below.

EXAMPLE 1

10 g of dehydrated butter (hereafter indicated by the initials AMFS corresponding to the expression "anhydrous milk-based fatty substance") is heated to 40° C. under nitrogen, in the presence of 0.5 g of beta-cyclodextrin ALDRICH. After three hours of heating at 40° C., 100 ml of demineralized water is poured in and the reactional medium is maintained under stirring at 40° C. for three hours.

The aqueous phase and the lipid phase (or final fatty substance) obtained after decanting are collected separately. The lipid phase collected after decanting is washed 3 times with 3×100 ml of demineralized water. This example was repeated.

The results are shown in the following table (col. 2) where the abbreviation BCD indicates beta-cyclodextrin. The first attempt enabled 26% of the cholesterol contained in the AMFS to be eliminated. The degree of cholesterol eliminated was checked as follows: measurement of the cholesterol contained in the original fatty substance, in the final fatty substance and in the aqueous phase, by chromatography in a gaseous phase on a capillary column with stigmasterol for internal standard.

EXAMPLE 2

The process is as indicated in example No. 1, using 1 g of beta-cyclodextrin.

The results are shown in table No. 1 in column No. 1. This attempt enabled 33% of the initial cholesterol to be eliminated.

EXAMPLE 3

Dehydrated butter, after a first treatment similar to that of example No. 1, has a new quantity (0.45 g) of beta-cyclodextrin added to it and is again heated to 40° C. for three hours. After aqueous extraction has been carried out and the lipid phase has been washed three times with water, the operation is repeated a second time with 0.40 g of beta-cyclodextrin. The results are shown in table No. 1 in columns 3 and 4. This attempt, with three successive extractions, enabled 41% of the cholesterol contained in the AMFS to be eliminated.

EXAMPLE 4

10 g of lard is heated to 50° C. under nitrogen in the presence of 0.5 g of beta-cyclodextrin.

After three hours of heating at 50° C., 100 ml of demineralized water is added and the reactional mixture is maintained under stirring at 50° C. for three hours.

After decanting the aqueous phase, the fatty phase is washed with water. Analysis of the residual cholesterol content in the fatty phase shows that 17% of the cholesterol has been eliminated in a single operation.

EXAMPLE 5

A treatment similar to that of examples 1 and 4 carried out on suet enables 18% of the cholesterol of the fatty substance to be eliminated in a single operation.

|  |  | Control | column 1 $\beta CD = 0.1$ FS | column 2 $\beta CD = 0.05$ FS | column 3 $\beta CD = 0.05$ FS − 2nd Ext. | column 4 $\beta CD = 0.05$ FS − 3rd Ext. |
|---|---|---|---|---|---|---|
| AMFS | % cholesterol | 0.27 | 0.18 | 0.20 | 0.175 | 0.16 |
|  | % cholesterol eliminated | 0 | −33 | −26 | −35 | −41 |
| SUET | % cholesterol | 0.12 |  | 0.10 |  |  |
|  | % cholesterol eliminated | 0 |  | −17 |  |  |
| LARD | % cholesterol | 0.11 |  | 0.09 |  |  |
|  | % cholesterol eliminated | 0 |  | −18 |  |  |

What is claimed is:

1. Process for eliminating cholesterol contained in a fatty substance of animal origin used in human diet of the group consisting of butter, suet and lard, which process comprises putting the liquefied fatty substance into contact with a cyclodextrin, continuing this contact under stirring for 30 minutes to 10 hours at a temperature between the fusion temperature of the fatty substance and 80° C., in such a way as to allow the formation of complexes between the cholesterol and the cyclodextrin, and separating the said complexes by entrainment in water and separation of the aqueous phase.

2. Process according to claim 1 wherein there is a stage of washing with water of the lipid phase collected after separation of the aqueous phase.

3. Process according to claim 2 wherein the said lipid phase is submitted to at least a second cycle of extraction.

4. Process according to claim 1 wherein the fatty substance is butter.

5. Process according to claim 1 wherein the fatty substance is suet.

6. Process according to claim 1 wherein the fatty substance is lard.

7. Process according to claim 1 wherein the cyclodextrin used is beta-cyclodextrin.

8. Process according to claim 7 wherein the beta-cyclodextrin is added in such a quantity that is represents 1 to 20% by weight of the fatty substance.

9. Process according to claim 8 wherein the beta-cyclodextrin is added in such a quantity that it represents 5 to 10% by weight of the fatty substance.

10. Fatty substance with reduced cholesterol obtained by a process claimed in claim 1.

11. Fatty substance according to claim 10 which is obtained from butter.

12. Fatty substance according to claim 10 which is obtained from suet.

13. Fatty substance according to claim 10 which is obtained from lard.

* * * * *